(12) United States Patent
Inoue et al.

(10) Patent No.: US 7,092,203 B2
(45) Date of Patent: Aug. 15, 2006

(54) METHOD OF MANUFACTURING A FLUID DYNAMIC BEARING APPLICABLE TO A DISK DRIVE THAT INCLUDES WELDING A COVER MEMBER TO A CYLINDRICAL WALL OF A SHAFT BASE

(75) Inventors: Kiyofumi Inoue, Kyoto (JP); Katsutoshi Hamada, Kyoto (JP); Kaoru Uenosono, Ozu (JP)

(73) Assignee: Nidec Corporation, Kyoto (JP)

( * ) Notice: Subject to any disclaimer, the term of this patent is extended or adjusted under 35 U.S.C. 154(b) by 92 days.

(21) Appl. No.: 10/711,948

(22) Filed: Oct. 15, 2004

(65) Prior Publication Data
US 2005/0081384 A1 Apr. 21, 2005

(30) Foreign Application Priority Data
Oct. 15, 2003 (JP) .............................. 2003-354579

(51) Int. Cl.
G11B 17/02 (2006.01)
F16C 32/06 (2006.01)

(52) U.S. Cl. .................. 360/98.07; 384/107; 384/110; 310/90

(58) Field of Classification Search ...................... None
See application file for complete search history.

(56) References Cited

U.S. PATENT DOCUMENTS

| 6,375,357 | B1* | 4/2002 | Miura et al. ................. 384/100 |
| 6,594,883 | B1 | 7/2003 | Kloeppel et al. ............. 29/596 |
| 6,664,687 | B1 | 12/2003 | Ichiyama .................... 310/90.5 |
| 6,686,674 | B1 | 2/2004 | Ichiyama ..................... 310/90 |
| 6,717,310 | B1* | 4/2004 | Yoshikawa et al. ........... 310/90 |
| 6,781,266 | B1* | 8/2004 | Le et al. ........................ 310/90 |
| 6,787,954 | B1* | 9/2004 | Yoshitsugu et al. ........... 310/90 |
| 6,962,442 | B1* | 11/2005 | Braun ......................... 384/110 |
| 6,980,394 | B1* | 12/2005 | Inoue et al. .............. 360/99.08 |
| 2002/0012483 | A1* | 1/2002 | Miura et al. ................. 384/100 |
| 2003/0147570 | A1* | 8/2003 | Gredinberg et al. ......... 384/107 |
| 2004/0161182 | A1* | 8/2004 | Kusaka et al. .............. 384/107 |
| 2005/0000092 | A1* | 1/2005 | Misu et al. ............... 29/898.02 |
| 2005/0025405 | A1* | 2/2005 | Tamaoka .................... 384/107 |
| 2005/0190998 | A1* | 9/2005 | Neumann .................... 384/119 |

FOREIGN PATENT DOCUMENTS

| JP | 2002-310146 A | 10/2002 |
| JP | 2003-032961 A | 1/2003 |
| JP | 2003-035312 A | 2/2003 |
| JP | 2003-056567 A | 2/2003 |
| JP | 2003-061298 A | 2/2003 |
| JP | 2003-158861 A | 5/2003 |
| JP | 2003-180066 A | 6/2003 |
| JP | 2004-019705 A | 1/2004 |
| JP | 2004-092814 A | 3/2004 |
| JP | 2004-135419 A | 4/2004 |
| JP | 2004-147459 A | 5/2004 |

* cited by examiner

*Primary Examiner*—Jefferson Evans
(74) *Attorney, Agent, or Firm*—Judge & Murakami IP

(57) ABSTRACT

A method of manufacturing a fluid dynamic bearing in which a stopper is fixed by welding. The bearing comprises a hub, a shaft erected on the hub, a sleeve, a cylindrical wall erected on the hub, and the stopper mounted on the cylindrical wall. The method comprises a first step to hold oil in the bearing gap, and a second step to locate the stopper on the peripheral wall being apart from the interface of the oil to fix the stopper by LASER welding.

31 Claims, 10 Drawing Sheets

METHOD OF MANUFACTURING A FLUID DYNAMIC BEARING APPLICABLE TO A DISK DRIVE THAT INCLUDES WELDING A COVER MEMBER TO A CYLINDRICAL WALL OF A SHAFT BASE

FIELD OF THE INVENTION

The present invention relates to a method of manufacturing a fluid dynamic bearing, or in particular to a method of manufacturing a fluid dynamic bearing used for a compact motor required to operate quietly at high speed such as a spindle motor for rotating the recording disk.

BACKGROUND INFORMATION

In recent years, quietude has been increasingly required of the recording disk drive unit including a hard disk with the increase in the rotational speed. For this reason, the fluid dynamic bearing has come to be widely used for the hard disk drive. The fluid dynamic bearing is configured of a fixed member and a rotational member. The fixed member and the rotational member are arranged in opposed relation, without mutual contact, to each other through a very small bearing gap. A lubricating fluid is filled in the bearing gap and the rotational member is rotatably supported on the fixed member by the dynamic pressure generated in the lubricating fluid.

The bearing gap between the component members of the fluid dynamic bearing is very narrow. In assembling the fluid dynamic bearing, therefore, a slight deformation of any member constituting the bearing would lead to the failure to achieve the intended performance or make a defective product. Therefore, the welding process, rather than pressure fitting or fitting, has come to be employed for assembling the fluid dynamic bearing.

The fixing process by welding causes a lesser deformation of the component members as a whole than the fixing process by pressure fitting or fitting. Further, as compared with the fixing process by bonding, the welding requires no setting time and therefore is higher in productivity. During the fixing process by bonding, a gas is emanated out of the organic adhesive solvent when the adhesive is set. The welding, on the other hand, generates no such gas, and can prevent the surface of the component members of the fluid dynamic bearing and the interior of the disk drive from being contaminated.

In the case where the welding process is used, however, the material is required to be heated to the melting point at the weld zone. A smaller fluid dynamic bearing is conspicuously affected by this heat. Especially, the lubricating oil used as a lubricating fluid generally cannot stand the high welding temperature. Further, the component members of the fluid dynamic bearing develop an uneven deformation by local heat. Specifically, the radial dynamic bearing unit for supporting the radial load has so small a bearing gap that special care must be taken of the effect of heat. In view of these problems, the lubricating oil is injected into the fluid dynamic bearing after being completely assembled.

To assure the assembly convenience of the fluid dynamic bearing, on the other hand, it is desired to inject the lubricating fluid before the welding process. A fluid dynamic bearing is available having such a structure that the interface between the lubricating oil and the air external to the fluid dynamic bearing is protected by a cover member to prevent the evaporation of the lubricating fluid or prevent the gasified oil from being discharged out of the fluid dynamic bearing. In the case where the adhesive and the lubricating oil come into contact with each other, the performance of the adhesive and the lubricating oil may be deteriorated by the chemical reaction. Also, in the case where the cover member has the function as a stopper of the rotational member, a heavy load may be imposed on the cover member due to an impact which may be exerted on the fluid dynamic bearing. Therefore, the cover member is desirably fixed by welding. In the case where the lubricating oil is injected after mounting the cover member, however, the lubricating oil flies out of the bearing and is required to be wiped off. This process brings about a reduced workability and an increased cost.

As described above, the conventional manufacturing method in which the parts are welded without adversely affecting the productivity is not existent.

A first object of this invention is to provide a method of manufacturing the fluid dynamic bearing in which the cover member is fixed by welding after the fluid dynamic bearing holds the lubricating oil.

A second object of the invention is to provide an inexpensive, reliable spindle motor.

A third object of the invention is to provide an inexpensive, reliable recording disk drive unit.

SUMMARY OF THE INVENTION

In the method of manufacturing the fluid dynamic bearing according to the invention, the radial dynamic bearing unit is located being apart from the cylindrical peripheral wall where the welding process is executed. Therefore, heat generated by the welding process is not easily propagated to the radial dynamic bearing and has no effect on the bearing characteristics of the radial dynamic bearing. Further, the lubricating oil interface is kept out of direct contact with the portion where the welding process is executed. Thus, the lubricating oil is not exposed to heat and prevented from being thermally degenerated.

Also, the dynamic bearing unit is formed inside the cylindrical peripheral wall. The cylindrical peripheral wall is formed on the shaft base, and the heat transmitted to the cylindrical peripheral wall propagates both inward and outward along the diameter of the shaft base. Thus, a lesser amount of heat is transmitted to the bearing portion.

The welding process is executed by radiating a directive energy beam, and as compared with the resistance welding or arc welding, can secure a higher fastening strength with a smaller heat input. In addition, the directive energy beam, for its high directivity, makes possible the welding of detailed parts and therefore can be used also for a miniature fluid dynamic bearing.

The directive energy beam is defined as an energy beam such as a laser beam, an electron beam or an ion plasma beam concentrated at a point. Of all the energy beams having a directivity, the laser beam welding using the laser beam makes possible the welding process under atmospheric pressure, can be handled with comparative ease and therefore improves the productivity.

Also, at least a part of the end of the sleeve member nearer to the shaft base is more desirably in spatially opposed relation to the end of the shaft base in axial direction so that the particular space holds the lubricating oil thereby to form a thrust dynamic bearing unit.

In order to suppress the effect of heat on the fluid dynamic bearing, a third step is more preferably included in which a heat radiating member is fitted on the outer peripheral surface of the cylindrical peripheral wall where the welding process is affected. The heat input for welding is radiated by being absorbed at least partially into the radiation member. Especially in the case where a material higher in heat conductivity than the shaft base is used as a radiating member, heat is propagated in a lesser amount to the shaft base than to the radiating member higher in heat conductivity. This effect is conspicuously exhibited, for example, when using stainless steel for the shaft base and aluminum or copper for the radiating member.

Further, a fourth step is more preferably included, in which during and after welding, a cooling fluid is applied to the weld zone and the neighborhood thereof thereby to cool the weld zone directly. This cooling fluid may be either a gas or liquid. Nevertheless, a rare gas such as argon or helium or a nitrogen gas is a choice for its low reactivity with metal, stability at high temperatures and a low acquisition cost.

The fluid dynamic bearing according to this invention has an interface formed between the outer peripheral surface of a sleeve member and the inner peripheral surface of a cylindrical peripheral wall. After the first step, a fifth step is preferably included to check the interface of the lubricating oil before the second step. By so doing, the weld zone can be kept out of contact with the lubricating oil. In this way, the lubricating oil is prevented from being thermally degenerated by being directly exposed to the heat input during the welding process. Therefore, it is possible to prevent the burning of the fluid dynamic bearing which otherwise might be caused by an insufficient lubricating oil amount or the leakage of the lubricating oil which otherwise might be caused by an excessive lubricating oil amount, thereby reducing the fraction defective of the products. This step of checking the interface can be executed by a position detector using, for example, a laser beam or ultrasonic wave. The interface position may alternatively be confirmed visually with a magnifier, a stereoscopic microscope or naked eyes. These detectors and detection means are easy to handle and involve no complicated process and therefore the productivity can be improved without any cost increase.

Further, the cover member according to the invention can be configured to operate as a stopper of the rotational member. Specifically, the diameter of the outer peripheral surface of the sleeve at one end thereof is increased beyond the diameter of the outer peripheral surface of the sleeve at the other end thereof, while the diameter of the inner peripheral surface of the cover member is increased beyond the diameter of the outer peripheral surface at one end of the sleeve member and smaller than the diameter of the outer peripheral surface at the other end thereof. More preferably, a part of the outer peripheral surface of the sleeve member is stepped. By doing so, the cover member necessarily engages the step between one end and the other end of the sleeve member so that the sleeve member is prevented from coming off more than a predetermined distance from the shaft.

In the case where the cover member is used as a stopper, the maximum axial distance coverage (axial play) of the shaft and the sleeve is defined by the position where the stopper is mounted. The cover member, therefore, is required to be set in position before being welded. This step can be eliminated in the case where the cylindrical peripheral wall is stepped to engage the cover member in position. In view of the need of improving the accuracy of forming the step, however, the following method can be used. Specifically, the height of the step formed on the outer peripheral surface of the sleeve member is measured in advance by the position measuring instrument such as a laser displacement gauge. After that, the outer peripheral surface of the cover member is fitted under light pressure on the inner peripheral surface of the cylindrical peripheral wall, and the cover member is pushed against the opposite side by a push jig into position. According to this method, the accuracy of height adjustment can be improved by improving the accuracy of the push jig, thereby reducing the variations between individual members.

The thrust dynamic bearing and the radial dynamic bearing may be so configured that the lubricating oil is held continuously. In such a bearing, the area of the interface formed between the lubricating oil and the atmosphere can be reduced. Therefore, the heat generated by welding, even if transmitted to the lubricating oil, is radiated to the members making up the fluid dynamic bearing smaller in specific heat than the atmospheric air. Further, the lubricating oil is prevented from depletion by evaporation. In addition, the oxidization of the lubricating oil by the atmospheric air can be prevented.

These effects are conspicuously exhibited by configuring a cup-shaped bearing housing with a single interface.

The sleeve member is preferably configured of a sleeve having a cylindrical inner peripheral surface and a bearing housing covering the outer peripheral surface of the sleeve. Then, the inner peripheral surface of the sleeve requiring a high machining accuracy can be machined separately from other parts, and the cost of the product as a whole can be reduced. Further, the sleeve is preferably formed of a sintered porous metal. The sintered porous material is soaked with the lubricating oil, so that the lubricating oil is supplied and always held on the bearing surface of the fluid dynamic bearing. The lubricating oil is thus not easily depleted but appropriately circulated. Should part of the lubricating oil be degenerated, the adverse effect of the degeneration can be alleviated.

The welding process is executed at the outer peripheral end of the annular cover member, a part of the inner peripheral wall of the cylindrical peripheral wall or the opening end of the cylindrical peripheral wall. In the process, the cover member is preferably welded at a plurality of points along the outer peripheral edge of cover member, and the weld point is distributed symmetrically along a circle with respect to the center point of cover member. In the case where the cover member is mounted on a rotational member, for example, the accuracy of rotation can be improved by welding symmetrically along a circle. The symmetrical welding process also prevents an excessively large force from being generated by a part of the periphery and the cover member from coming off.

Further, the welding process may be executed continuously along the peripheral direction. This welding process is conducted in the case where an especially high fastening strength is required although the heat input amount is increased by welding. By doing so, the stress can be generated uniformly along the peripheral direction and therefore the fastening durability is improved. Also, the application of stress over the periphery, instead of supporting at a point, reduces the stress exerted at an arbitrary point. As a result, the welding strength can be reduced as compared with the case in which a plurality of points on the periphery is welded.

The fluid dynamic bearing manufactured by the method according to this invention is suitable for applications for high-speed and quiet rotation. Specifically, the fluid dynamic bearing is suitably used for a spindle motor mounted on the recording disk drive unit to rotate the recording disk. The fluid dynamic bearing according to this invention is high in productivity and low in cost, and therefore an inexpensive spindle motor can be mass produced. In addition, the use of the welding process for fixing, instead of by bonding or pressure fitting in the prior art, can increase the fastening strength. The spindle motor equipped with this fluid dynamic bearing has a long service life and a higher resistance to impacts.

The shaft base may be a rotor hub having a surface on which a recording disk constituting a rotational member is mounted. As an alternative, the shaft base may be formed as a base plate constituting a part of the housing of the recording disk or the bracket of the spindle motor.

EMBODIMENT OF THE INVENTION

Figure 1:
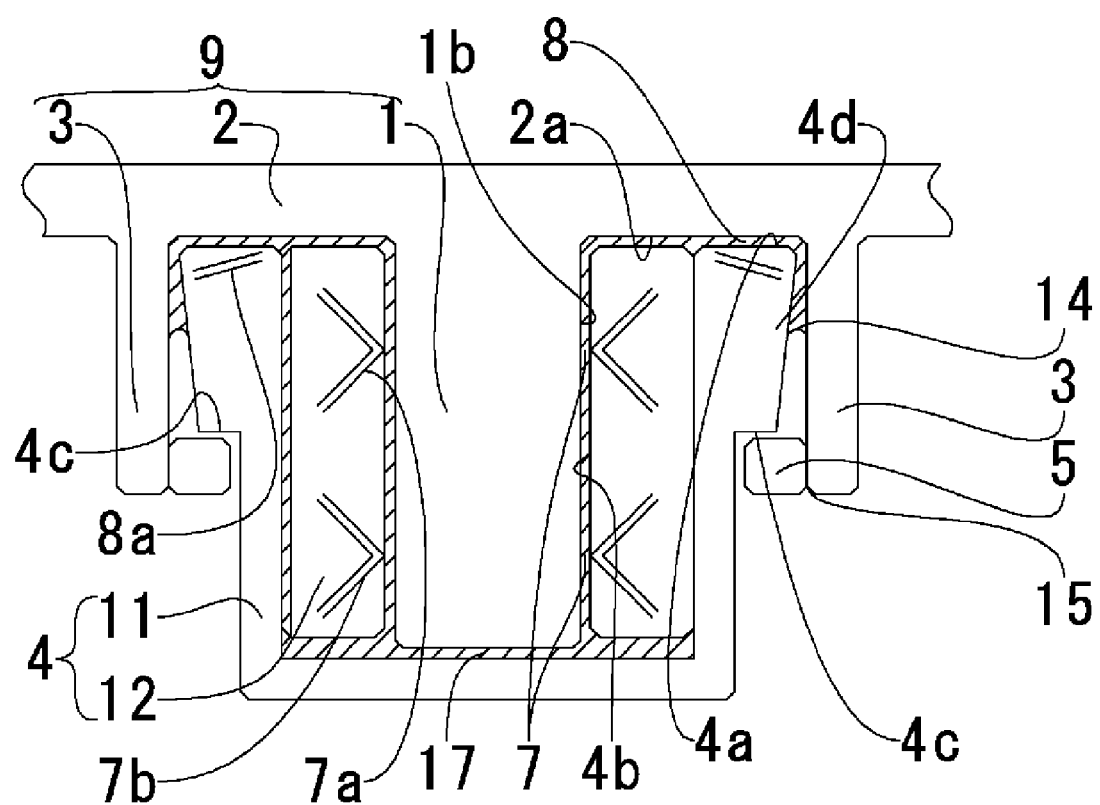
FIG. 1 is a sectional view showing a fluid dynamic bearing manufactured by the manufacturing method according to a first embodiment of the invention.

An embodiment of the invention is explained below with reference to the drawings. The description of the embodiments below may contain an expression of the directions "vertical", "horizontal", etc. Unless otherwise specified, these directions should all be considered those on the page and should not be interpreted to limit the directions in actual applications. Also, by way of explanation or to facilitate the understanding, the bearing gaps in radial and axial directions of the fluid dynamic bearing are shown in exaggerated way in the drawings, and therefore not intended to indicate the actual size or dimensions accurately.

FIG. 1 shows a fluid dynamic bearing manufactured by the manufacturing method according to the invention.

The fluid dynamic bearing comprises a rotor hub 2 making up a shaft base. A shaft 1 and a cylindrical peripheral wall 3 are erected from the rotor hub 2. The shaft 1 and the cylindrical peripheral wall 3 make up a rotational member 9 together with the rotor hub.

A sleeve 12 having a substantially cylindrical inner peripheral surface 4b rotatably supporting the shaft 1 is fixedly fitted in a substantially cup-shaped bearing housing 11. The bearing housing 11 and the sleeve 12 fixed therein make up a sleeve member 4.

A stopper 5 making up a cover member is fixed on the inner peripheral surface 3a of the cylindrical peripheral wall 3. The diameter of the outer peripheral surface of the bearing housing 11 is larger at an axially upper part than at an axially lower part thereof. Especially, the axially upper part makes up a large diameter section 4d and separated from the axially lower part of the outer peripheral surface by a sleeve step 4c. The diameter of the inner peripheral surface of the stopper 5 is larger than the diameter of the axially lower part of the outer peripheral surface of the bearing housing 11 and smaller than the large diameter section 4d. The sleeve member 4 attempting to move a predetermined distance or more in axial direction from the rotor hub 2, therefore, is stopped by the stopper 5 adapted to engage the sleeve step 4c.

The inner peripheral surface 4b of the sleeve 12 and the outer peripheral surface 1b of the shaft 1 are in opposed relation to each other through a minuscule gap in radial direction. A lubricating oil 17 is held and a radial dynamic bearing unit 7 is formed in this radial minuscule gap.

Also radial dynamic grooves 7a, 7b to help generate the dynamic pressure are formed on the inner peripheral surface 4b of the sleeve 12 making up the radial dynamic bearing 7. The radial dynamic grooves 7a, 7b may alternatively be formed on the outer peripheral surface 1b of the shaft 1.

The flat surface 2a of the rotor hub 2 defined between the shaft 1 of the rotor hub 2 and the cylindrical peripheral wall 3 is arranged in opposed relation to the upper end surface 4a of the bearing housing 11 through a minuscule gap in axial direction. This axial minuscule gap also holds the lubricating oil 17 and has a thrust dynamic bearing unit 8 formed therein.

A thrust dynamic groove 8a to help generate the dynamic pressure is formed on the upper end surface 4a of the bearing housing 111 constituting the thrust dynamic bearing unit 8. The thrust dynamic groove 8a may alternatively be formed on the flat surface 2a of the rotor hub 2.

A single interface 14 between the lubricating oil 17 and the atmosphere is formed between the outer peripheral surface of the large diameter section 4d of the bearing housing 11 and the inner peripheral surface 3d of the cylindrical peripheral wall 3 facing the outer peripheral surface of the large diameter section 4d in radial direction. The gap between the outer peripheral surface of the large diameter section 4d of the bearing housing 11 and the inner peripheral surface of the cylindrical peripheral wall 3 is enlarged progressively downward in FIG. 1. The stopper 5 constituting the cover member is located at the opening of the gap forming the interface 14 and prevents the lubricating oil 17 from flying out.

The thrust dynamic bearing unit 8 and the radial dynamic bearing unit 7 located radially inward of the interface 14 holds the lubricating oil 17 continuously. Also, the lubricating oil 17 is continuously held in the bearing housing 11. This structure is called a "Full Oil Filled" structure, in which the air is shut out from the fluid dynamic bearing and the lubricating oil is not easily evaporated, and therefore the performance and the service life are improved at the same time.

Figure 5:
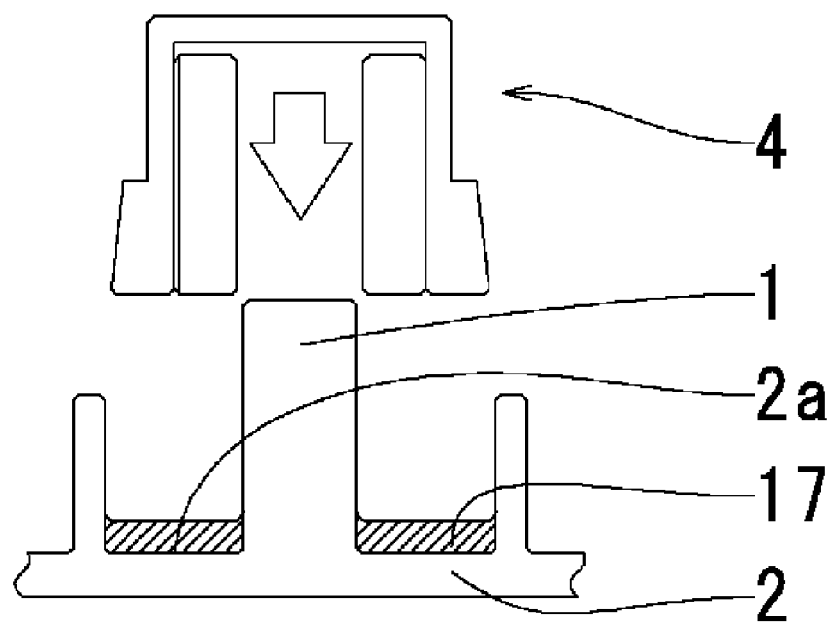
FIGS. 5(a)–5(d) shows the first to fifth steps of the manufacturing method according to the invention.
Figure 5:
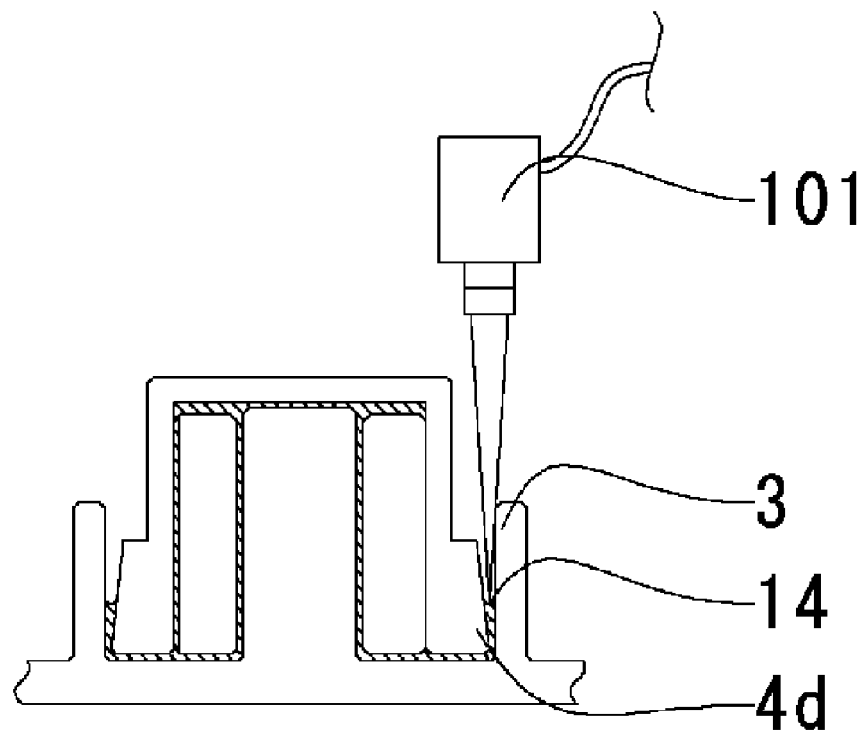
Figure 5:
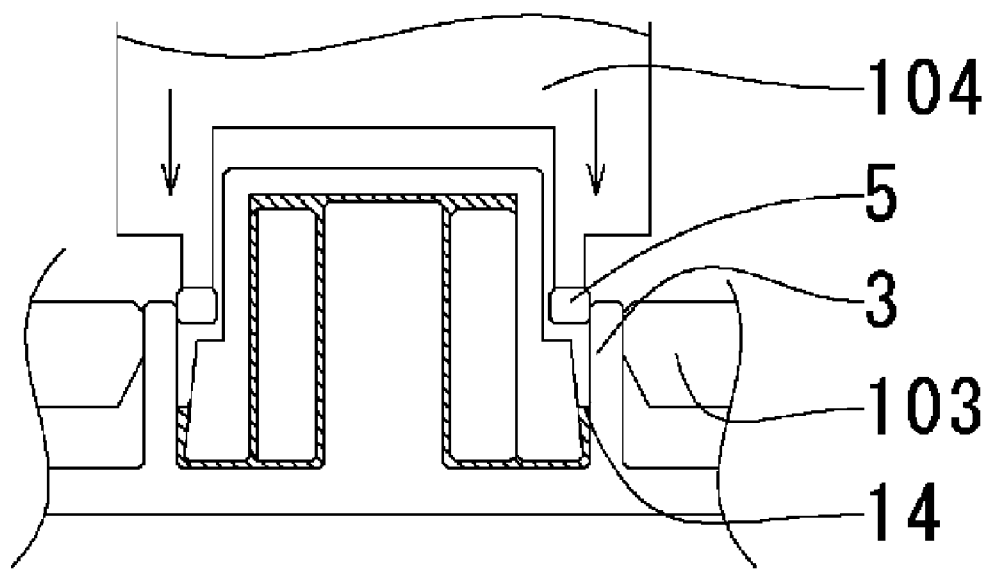
Figure 5:
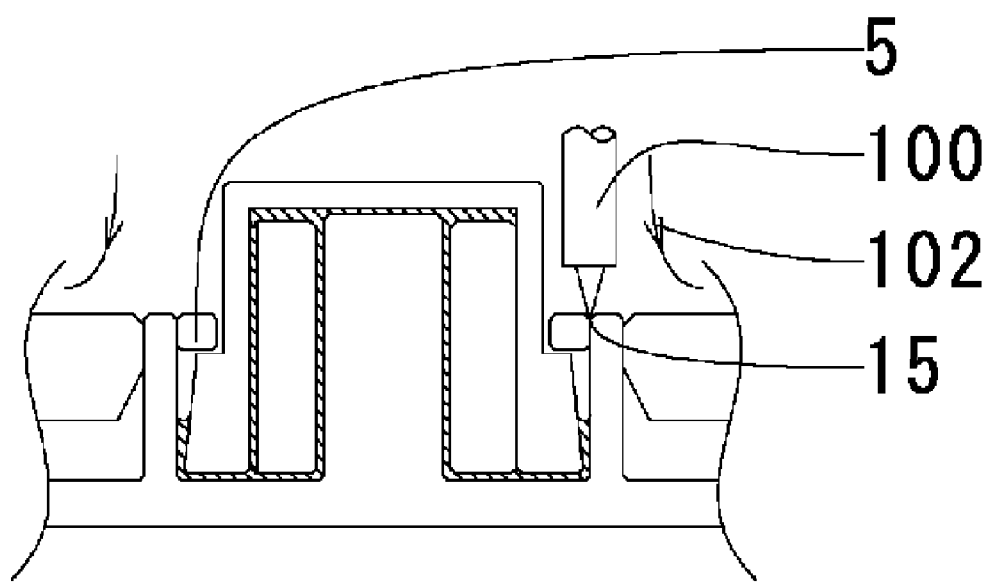

The lubricating oil 17 can be held in the fluid dynamic bearing having this structure in any of several methods. As shown in FIG. 5a, for example, a predetermined amount of lubricating oil is stored on the flat surface 2a of the rotor hub 2 in vacuum, the shaft 1 is inserted along the inner peripheral surface of the sleeve member 4 and the pressure is restored to the atmospheric pressure. By this method, the lubricating oil is held continuously in both the sleeve member 4 and the thrust dynamic bearing unit 8. In addition, this method of injecting the lubricating oil 17 prevents the lubricating oil 17 from flying out and intruding into the fastening portion between the component members. Further, the step of wiping off the lubricating oil is simplified.

This fluid dynamic bearing is manufactured by following the steps shown in FIGS. 5(a) to 5(d).

First, the lubricating oil 17 is injected into the fluid dynamic bearing by the method described above or any other appropriate method.

After that, as shown in FIG. 5(b), the position of the interface 14 between the lubricating oil 17 and the atmosphere is confirmed using the check means 101. The position of the interface 14 can be confirmed by the check means such as a magnifier, naked eyes, a measuring instrument such as a camera using the visible light, an ultrasonic displacement gauge or a position detector utilizing the long wavelength electromagnetic wave or single-wavelength laser beam.

Figure 4:
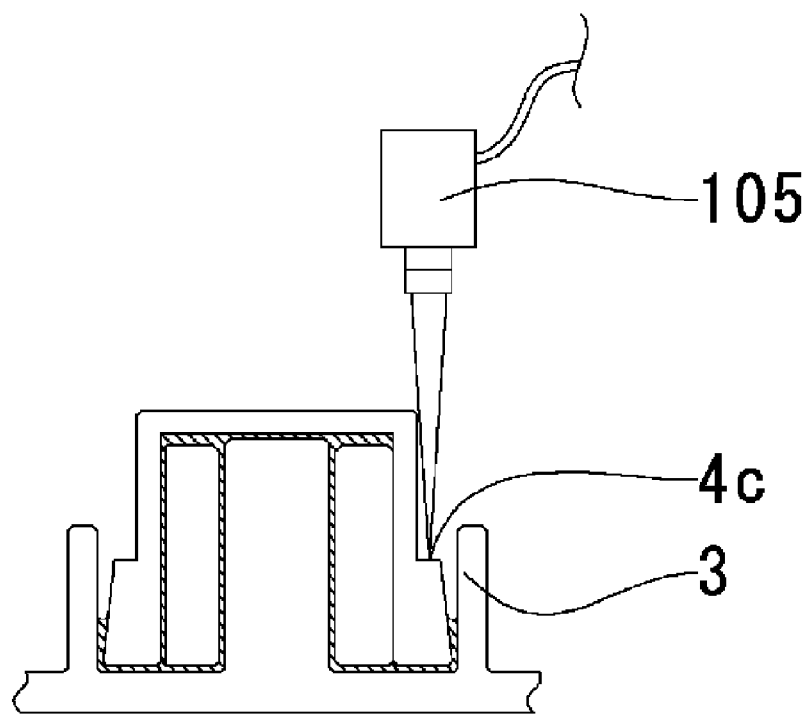
FIGS. 4(a)–4(d) shows the sixth step of the manufacturing method according to the invention in which the stopper making up the cover member is set in position.
Figure 4:
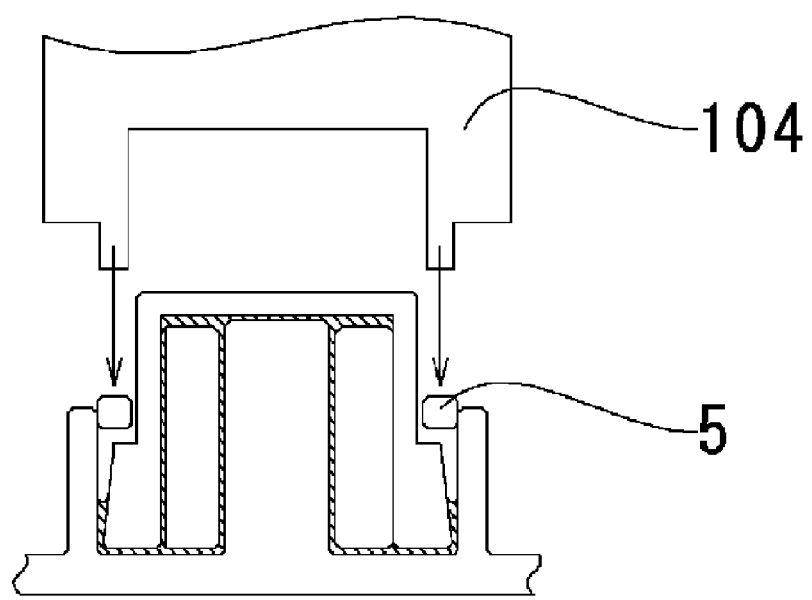
Figure 4:
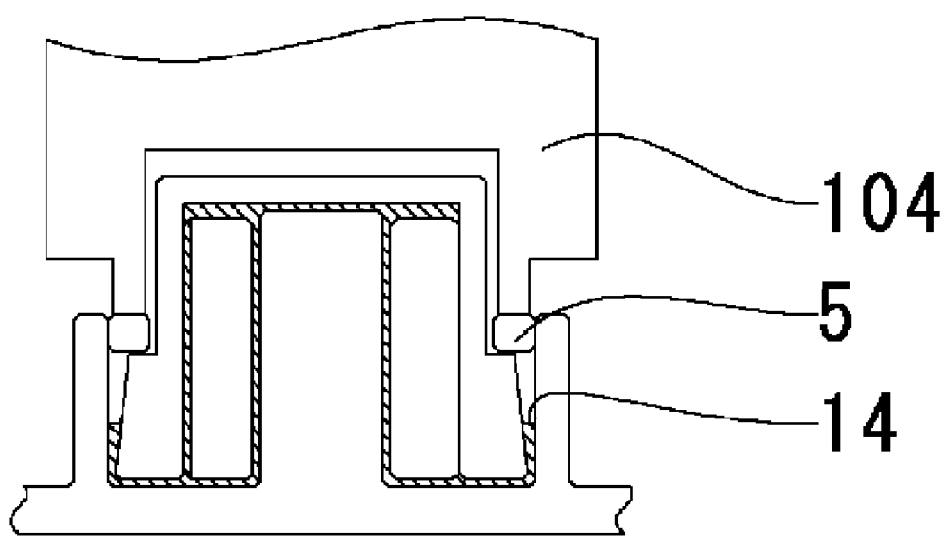
Figure 4:
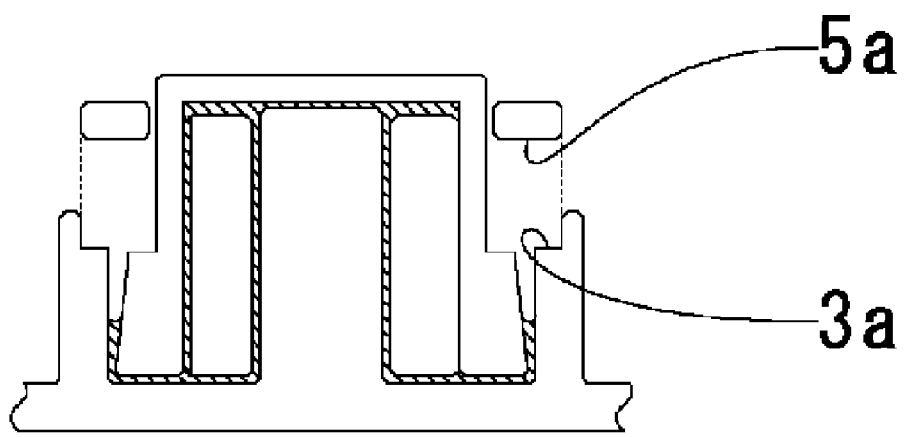

Then, as shown in FIG. 5(c), the stopper 5 is fitted on the inner peripheral surface of the cylindrical peripheral wall 3. According to this embodiment, the method shown in FIGS. 4(a) to 4(c) is used. As shown in FIG. 4(a), the height of the step 4c formed on the outer peripheral surface of the bearing housing 11 is measured by the laser displacement gauge 105. As shown in FIG. 4(b), the stopper 5 is fitted under light pressure along the inner peripheral surface of the cylindrical peripheral wall 3. Using a push jig 104, the sleeve member 4 is pushed in along the shaft 1 to the axially maximum movable distance based on the position data obtained by the measurement of the laser displacement gauge 105. The measurement accuracy of the laser displacement gauge 105 is very high as compared with the required minimum accuracy, and the push jig 104 can be controlled also with an accuracy sufficiently higher than the required minimum accuracy. As an alternative, as shown in FIG. 4(d), a step 3a may be formed in advance on the cylindrical peripheral wall 3 for positioning. In this case, the positioning accuracy of the stopper 5 can be secured by increasing the machining accuracy of the step 3a formed on the cylindrical peripheral wall 3.

Once the appropriateness of the positions of the interface 14 and the stopper 5 is confirmed, the stopper 5 is fixedly welded by a laser welder 100 on the cylindrical peripheral wall 3. The weld zone 15 thus welded by laser is formed continuously in peripheral direction. By doing so, the lubricating oil 17 is prevented from leaking out through the gap which otherwise might be formed between the stopper 5 and the cylindrical peripheral wall 3.

The laser welding process, as compared with other welding processes such as arc welding and resistance welding, can produce a higher fastening strength with a smaller heat input. Further, this energy beam welding process can be executed in other than vacuum and finds wide applications also in other fields. Therefore, this welding process can be handled with comparative ease. In addition, the directivity is so high that the positional accuracy of welding is improved, thereby making possible the welding of detailed points of precision parts. Incidentally, the stopper 5 is mounted on the rotational member 9 formed on the rotor hub 2, and therefore the weld zone 15 is required to be formed symmetrically on a circle at least as viewed from the center of rotation.

The laser welding, as compared with other welding processes, requires a lesser amount of heat input to obtain the same fastening strength. Nevertheless, the heat input is still large. According to this embodiment, during the welding process, as shown in FIG. 5(c), the radiator 103 remains fitted on the outer peripheral portion of the cylindrical peripheral wall 3 welded. The radiator 103 is formed of a metal high in heat conductivity such as copper or aluminum.

Also, the radiation efficiency can be improved by circulating oil, water or other fluid in the radiator. The radiator 103 is removable after completing the welding process, and prevents the fume generated during the welding process from attaching to the interior of the rotor hub 2.

Also, the argon gas constituting the cooling fluid 102 is supplied to the weld zone and the neighborhood thereof during and after the welding process. The cooling fluid 102 is preferably made of a gaseous material very low in reactivity with the lubricating oil and the component members of the fluid dynamic bearing. According to this embodiment, the rare gas of argon is used. Nevertheless, helium which is a rare gas high in cooling efficiency and low in reactivity or a comparatively inexpensive, stable nitrogen gas readily acquired is an alternate choice.

Further, the cooling fluid 102 flowing on the radiator 102 facilitates the flow of the fluid and absorbs the heat transmitted to the radiator 103. Thus, the weld zone and the neighborhood thereof can be cooled efficiently.

According to this embodiment, the rotor hub 2 making up the shaft base is formed of martensitic stainless steel (SUS420), and the stopper 5 ferritic stainless steel (SUS430). The cylindrical peripheral wall 3 is formed integrally with the rotor hub 2. The sleeve 12 of the sleeve member 4 is formed of a sintered porous metal material, and the bearing housing 11 brass. The stopper is formed as an annular member having an axial thickness of 0.6 mm, an outer diameter of 8 mm and an inner diameter of 6 mm. The total height of the bearing is about 5 mm. The welding process was conducted by the laser welder 100 with the energy of 1 J/pulse at the rate of 5 pulses per second. In order to make sure that the weld zone is closely superposed along the circumference of the outer peripheral edge of the stopper 5, the welding was conducted at the speed of 0.6 mm per second. Using the argon gas as a cooling fluid, the weld zone and the neighborhood was cooled during and after the welding process.

As a result, the weld zone is about 0.3 mm in diameter and 0.1 mm deep, and the maximum temperature of the weld zone corresponding to the maximum temperature reached by the lower surface of the stopper 5 shown in FIG. 1 was about 100° C. The ester lubricating oil generally used for the fluid dynamic bearing is resistant to the temperature of up to about 150° C. Specifically, the fluid dynamic bearing according to the invention is so configured that the interface 14 between the lubricating oil 17 and the atmosphere is not in direct contact with the weld zone 15, or its neighborhood, of the cylindrical peripheral wall 3 and the stopper 5. Even in the case where the stopper 5 constituting the cover member is fixed by laser welding after injecting the lubricating oil 17 into the fluid dynamic bearing, therefore, the lubricating oil 17 is not adversely affected by the welding heat.

The use of the laser welding for fixing the stopper 5, on the other hand, can secure the fastening strength four or five times higher than in the conventional method using an adhesive.

Also, in order to reduce the heat transmitted to the lubricating oil 17, the thickness of the stopper 5 may be increased. Assuming that the thickness of the stopper 5 according to this embodiment is 1.0 mm, for example, the maximum temperature of the lower surface is at most 40° C. If the thickness of the stopper 5 is increased excessively, however, the height of the fluid dynamic bearing along the axial direction is increased undesirably. The thickness of 0.5 mm, on the other hand, increases the temperature to 170° C. which is not sufficiently safe. According to this embodiment, therefore, the best thickness of the stopper 5 is considered 0.6 mm at which the axial height is moderate and the lubricating oil 17 is not adversely affected by the temperature increase.

Figure 6:
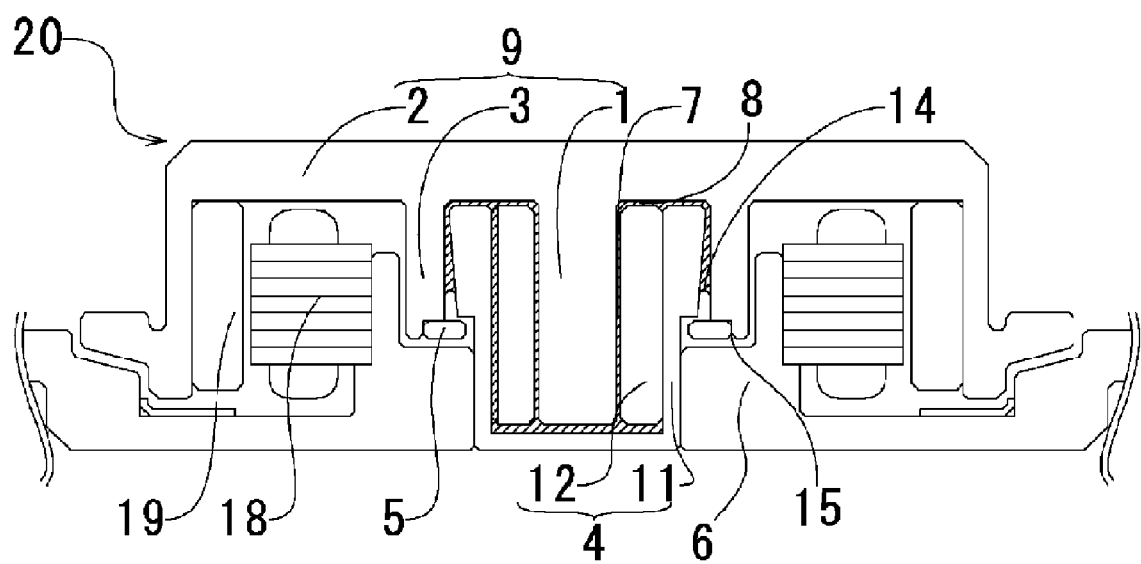
FIG. 6 is a sectional view of a spindle motor using a fluid dynamic bearing manufactured by the manufacturing method according to an embodiment of the invention.
Figure 8:
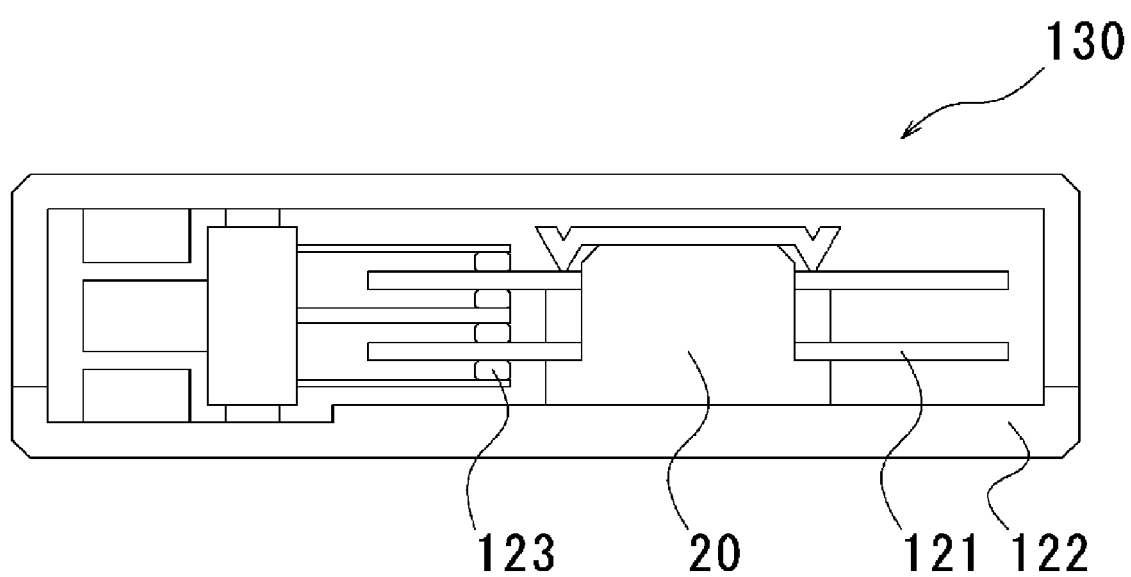
FIG. 8 is a sectional view schematically showing a recording disk drive unit having a spindle motor using a fluid dynamic bearing manufactured by the manufacturing method according to the invention.

The fluid dynamic bearing manufactured by the manufacturing method according to the invention is used for the recording disk drive unit 130 as a spindle motor 20 to rotate the recording disk 121. FIG. 6 shows the fluid dynamic bearing manufactured according to a first embodiment of the invention used as the spindle motor 20 to rotate the recording disk 121. FIG. 8 shows the recording disk drive unit 130 with the spindle motor 20 mounted thereon. The rotor hub 2 is formed with a surface on which the recording disk 121 is mounted. A rotor magnet 19 constituted of an annular permanent magnet is mounted on the rotor hub 2. The sleeve member 4 is fixed on the base plate 6 making up a part of the housing of the recording disk drive unit 30. A stator 18 is fixed in radially opposed relation to the inner peripheral surface of the rotor magnet 19 on the base plate 6. The stator 18 has a plurality of magnetic pole teeth each wound with a coil. When current is supplied to this coil, the stator 18 generates a magnetic field, which in collaboration with the rotor magnet 19, rotates the rotor magnet 19. The rotor magnet 19 and the rotor hub 2 are rotatably supported on the base plate 6 by the fluid dynamic bearing manufactured by the manufacturing method according to the invention.

Also, the interior of the recording disk drive unit 130 is hermetically sealed and forms a clean chamber. In the fluid dynamic bearing according to an embodiment of the invention, the radial gap forming the interface 14 is covered by the stopper 5 making up the cover member after holding the lubricating oil 17. As a result, the lubricating oil 17 is prevented from leaking out of the fluid dynamic bearing and therefore the internal cleanliness of the clean chamber is not reduced.

Figure 7:
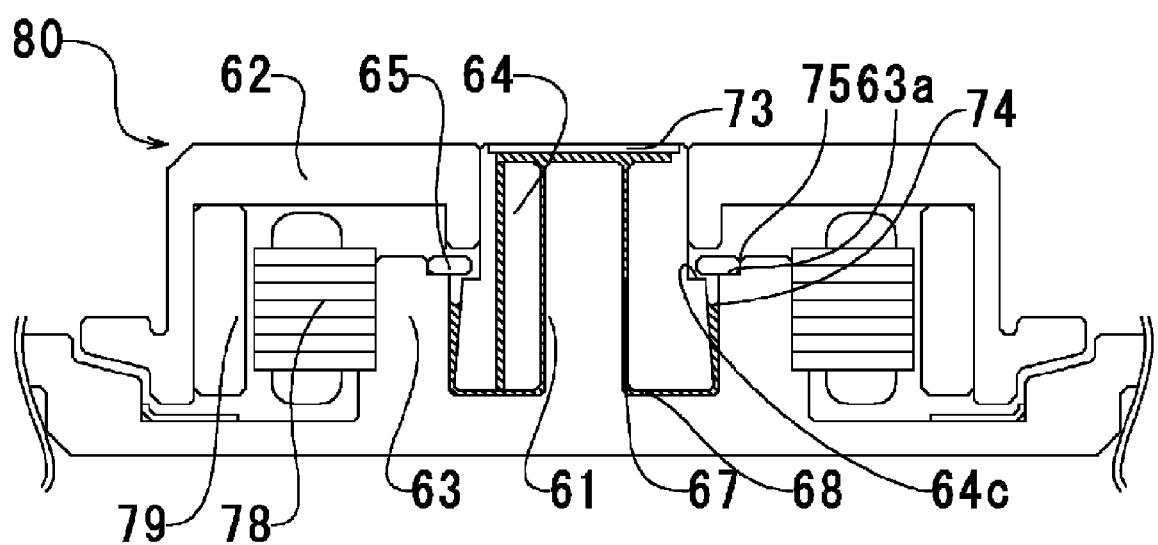
FIG. 7 is a sectional view of a spindle motor using a fluid dynamic bearing manufactured by the manufacturing method according to another embodiment of the invention.

FIG. 7 is a sectional view of a spindle motor using the fluid dynamic bearing manufactured by the manufacturing method according to another embodiment of the invention and used for a spindle motor for rotating the recording disk. The shaft 61 and the cylindrical peripheral wall 63 are erected on the base plate 66 making up the shaft base. The substantially cylindrical sleeve member 64 is mounted on the rotor hub 62. The upper end of the sleeve member 64 is sealed by a counter plate 73. A step 64c is formed on the outer peripheral surface of the sleeve member 64. The stopper 65 constituting a cover member is fixed in position on the forward end step formed at the opening end of the cylindrical peripheral wall 63.

Figure 2:
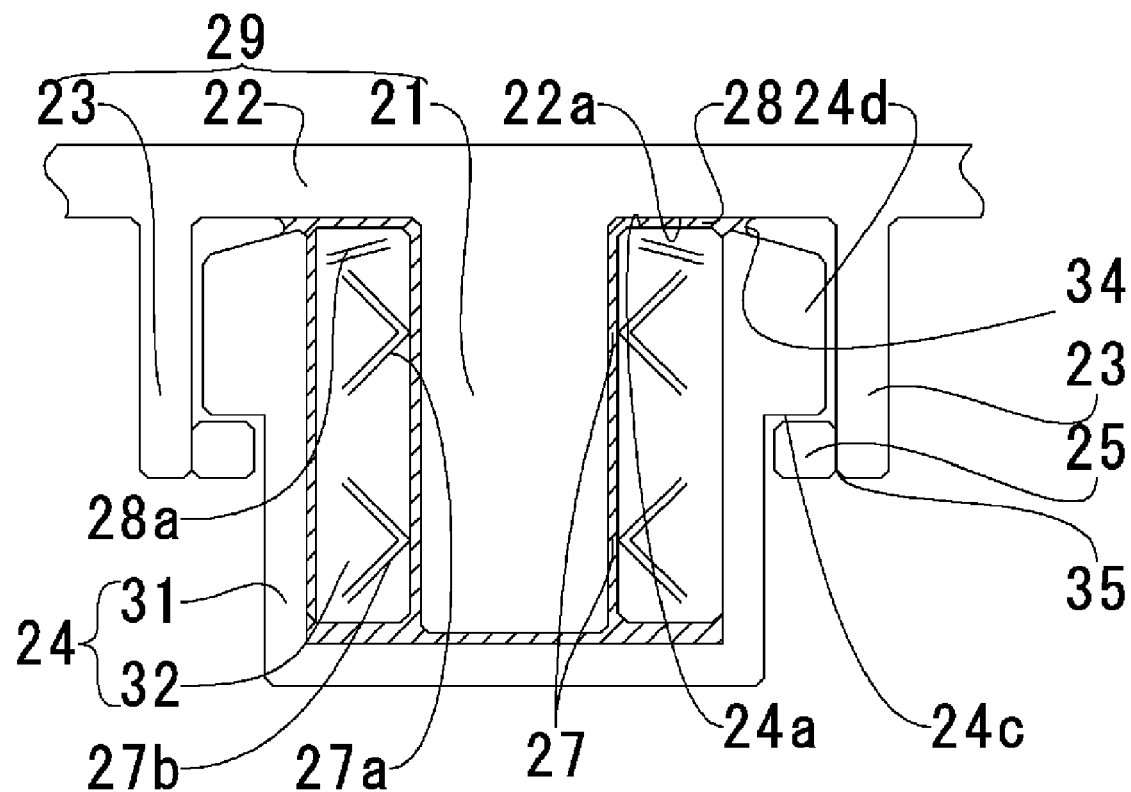
FIG. 2 is a sectional view showing a fluid dynamic bearing manufactured by the manufacturing method according to a second embodiment of the invention.

The present invention is not limited to the embodiments described above but variously modifiable without departing from the spirit and scope of the invention. As shown in FIG. 2, for example, the interface 34 between the lubricating oil 17 and the atmosphere may be formed between the upper end surface of the sleeve 24 and the opposite flat surface of the rotor hub 22. In this case, the lubricating oil 17 is held only at a position distant from the weld zone so that the effect of heat on the lubricating oil 17 can be further reduced.

Figure 3:
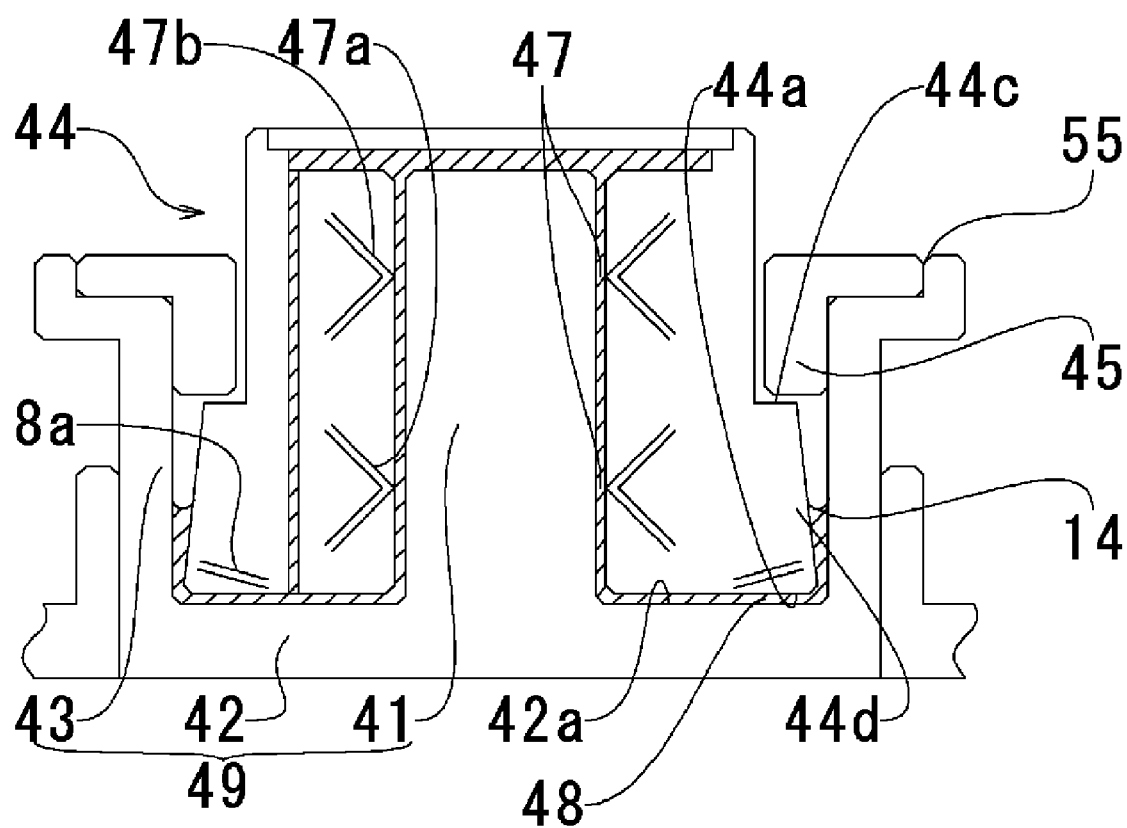
FIG. 3 is a sectional view showing a fluid dynamic bearing manufactured by the manufacturing method according to a third embodiment of the invention.

Also, as shown in FIG. 3, the weld zone 55 may be at a position radially more outward. In this case, the weld zone 55 is located farther from the radial dynamic bearing 47 and the thrust dynamic bearing 48, and therefore the welding heat hardly has an effect.

Any metal other than stainless steel described in this embodiment that can be welded such as aluminum or an alloy thereof, copper or an alloy thereof or a steel containing iron as a main component may be used as the material of the stopper and the cylindrical peripheral wall.

For the purpose of welding, the ultraviolet laser, the electron beam or the plasma beam other than the laser beam may be used.

Also, during the welding process, the metal is heated to higher than the melting point thereof, and therefore the metal vapor called the fume is generated. This fume is cooled and solidified into minuscule metal particles. According to this embodiment, the metal particles derived from fume were not attached on the surface of the component members of the fluid dynamic bearing. Before starting the welding process, however, a covering step should be included to apply a masking on the surface of the fluid dynamic bearing. This covering step can be executed by dry plating layer formed by sealing, coating resin, applying or vapor deposition of a paint or adhesive, sputtering or CVD.

Also, a similar covering step, if executed on the weld zone after welding, can prevent the fume attached on the weld zone from coming off.

Also, in the case where the masking is difficult, a vacuum mechanism to suck off the fume may be arranged at a position facing the weld zone to keep off the fume from the surface of the members of the fluid dynamic bearing.

The bearing housing can be formed by cutting or pressing brass, stainless steel or aluminum. The bearing housing may alternatively be formed by injection molding. Also, the sleeve member may be configured of a single type of material.

What is claimed is:

1. A method of manufacturing a fluid dynamic bearing, the fluid dynamic bearing having:
   a shaft base having a flat surface on one side thereof;
   a shaft erected on one side of the shaft base and having a cylindrical outer peripheral surface;
   a sleeve member rotatably supported on and relatively to the shaft, the sleeve member including an inner peripheral surface in radially opposed relation to the outer peripheral surface of the shaft and an axial end surface in axially opposed relation to the flat surface, the sleeve member being fitted on the shaft;
   a cylindrical peripheral wall erected on one side of the shaft base in such a manner as to surround the radially outer part of the sleeve member; and
   an annular cover member having an inner peripheral edge smaller in diameter than the inner peripheral surface of the cylindrical peripheral wall, the cover member being mounted on the cylindrical peripheral wall;
   wherein at least a part of the gap between the outer peripheral surface of the shaft and the inner peripheral surface of the sleeve member which are in radially opposed relation to each other is secured as a minuscule radial bearing gap filled with the lubricating oil;
   the radial dynamic bearing is made up of the outer peripheral surface of the shaft, the inner peripheral surface of the sleeve and the radial bearing gap; and
   the flat surface of the shaft base plate member and the axial end surface of the sleeve member are in axially opposed relation to each other, and at least partially filled with the lubricating oil;
   the manufacturing method comprising:
   a first step to hold the lubricating oil in at least a part of said radial gap and said axial gap, in which the interface between the lubricating oil and the atmosphere is formed between the cylindrical peripheral wall and the outer peripheral surface of the sleeve member; and
   a second step to locate, after the first step, an axial end surface of the cover member being apart from the interface in axial direction, and to fixedly weld the cover member by radiating a directive energy beam on said cylindrical peripheral wall.

2. A method of manufacturing a fluid dynamic bearing according to claim 1,
wherein at least a part of the gap between the flat surface of said shaft base member and the axial end surface of said sleeve member which are in axially opposed relation to each other is secured as a minuscule thrust bearing gap filled with the lubricating oil, and
said flat surface of said shaft base member, the axial end surface of said sleeve member and said thrust bearing gap make up a thrust dynamic bearing.

3. A method of manufacturing a fluid dynamic bearing according to claim 2, further comprising, after said first step but before said second step, a fifth step for confirming the position of said interface.

4. A method of manufacturing a fluid dynamic bearing according to claim 3,
wherein one axial side of the outer peripheral surface of said sleeve member has a larger diameter than the other axial side thereof, and the diameter of the inner peripheral edge of said cover member is smaller than the diameter of the other axial side of the outer peripheral surface of said sleeve member, and said shaft and said sleeve member attempting to come away from each other at least a predetermined distance in axial direction engage each other and function as a stopper.

5. A method of manufacturing a fluid dynamic bearing according to claim 4, further comprising, before said second step, a sixth step for determining the position at which said cover member is fixed and provisionally fixing said cover member at said position.

6. A method of manufacturing a fluid dynamic bearing according to claim 5,
wherein said cover member is fixedly welded on said cylindrical peripheral wall at a plurality of points along the outer peripheral edge of said cover member, and said weld zone is distributed along a circle symmetrically with respect to the center point of said cover member.

7. A method of manufacturing a fluid dynamic bearing according to claim 5,
wherein said cover member is continuously welded peripherally along the outer peripheral edge thereof.

8. A method of manufacturing a fluid dynamic bearing according to claim 4,
wherein one axial end of the inner peripheral surface of said sleeve member is sealed and there is only one interface.

9. A method of manufacturing a fluid dynamic bearing according to claim 8,
wherein said sleeve member includes a substantially cylindrical sleeve having an inner peripheral surface radially opposed to the outer peripheral surface of said shaft, and a bearing housing located radially outward of said sleeve and having said sleeve fitted therein.

10. A method of manufacturing a fluid dynamic bearing according to claim 8,
wherein said cover member is continuously welded peripherally along the outer peripheral edge thereof.

11. A spindle motor for rotating a recording disk, comprising:
a fluid dynamic bearing manufactured by the manufacturing method described in claim 4, wherein said shaft base member has a surface on which to mount the recording disk;
an annular rotor magnet mounted on said rotor hub; and
a stator having a plurality of coils arranged in radially opposed relation to the peripheral surface of said rotor magnet.

12. A recording disk drive unit comprising:
a means for accessing the information recorded on the recording disk mounted on said rotor hub; and
the spindle motor described in claim 11.

13. A spindle motor for rotating a recording disk, comprising:
a fluid dynamic bearing manufactured by the manufacturing method described in claim 4, wherein said shaft base member constitutes at least a part of the housing of a recording disk drive unit;
a rotor hub mounted on said sleeve member;
an annular rotor magnet mounted on said rotor hub; and
a stator having a plurality of coils mounted on said base plate in radially opposed relation to the peripheral surface of said rotor magnet.

14. A recording disk drive unit comprising:
a means for accessing the information recorded on the recording disk mounted on said rotor hub; and
the spindle motor described in claim 13.

15. A method of manufacturing a fluid dynamic bearing according to claim 3,
wherein one axial end of the inner peripheral surface of said sleeve member is sealed and there is only one interface.

16. A method of manufacturing a fluid dynamic bearing according to claim 2,
wherein one axial side of the outer peripheral surface of said sleeve member has a larger diameter than the other axial side thereof, and the diameter of the inner peripheral edge of said cover member is smaller than the diameter of the other axial side of the outer peripheral surface of said sleeve member, and said shaft and said sleeve member attempting to come away from each other at least a predetermined distance in axial direction engage each other and function as a stopper.

17. A method of manufacturing a fluid dynamic bearing according to claim 2,
wherein one axial end of the inner peripheral surface of said sleeve member is sealed and there is only one interface.

18. A method of manufacturing a fluid dynamic bearing according to claim 2,
wherein said sleeve member includes a substantially cylindrical sleeve having an inner peripheral surface radially opposed to the outer peripheral surface of said shaft, and a bearing housing located radially outward of said sleeve and having said sleeve fitted therein.

19. A method of manufacturing a fluid dynamic bearing according to claim 1, further comprising, before said second step, a third step for fixedly fitting the radiator on the outer peripheral surface of said cylindrical peripheral wall.

20. A method of manufacturing a fluid dynamic bearing according to claim 19, further comprising, in and immediately after said second step, a fourth step for supplying the cooling fluid to the weld zone and the neighborhood thereof.

21. A method of manufacturing a fluid dynamic bearing according to claim 20,
wherein said cover member is fixedly welded on said cylindrical peripheral wall at a plurality of points along the outer peripheral edge of said cover member, and said weld zone is distributed along a circle symmetrically with respect to the center point of said cover member.

22. A method of manufacturing a fluid dynamic bearing according to claim 20,
wherein said cover member is continuously welded peripherally along the outer peripheral edge thereof.

23. A method of manufacturing a fluid dynamic bearing according to claim 1, further comprising, in and immediately after said second step, a fourth step for supplying the cooling fluid to the weld zone and the neighborhood thereof.

24. A method of manufacturing a fluid dynamic bearing according to claim 1, further comprising, after said first step but before said second step, a fifth step for confirming the position of said interface.

25. A method of manufacturing a fluid dynamic bearing according to claim 1,
wherein one axial side of the outer peripheral surface of said sleeve member has a larger diameter than the other axial side thereof, and the diameter of the inner peripheral edge of said cover member is smaller than the diameter of the other axial side of the outer peripheral surface of said sleeve member, and said shaft and said sleeve member attempting to come away from each other at least a predetermined distance in axial direction engage each other and function as a stopper.

26. A method of manufacturing a fluid dynamic bearing according to claim 25, further comprising, before said second step, a sixth step for determining the position at which said cover member is fixed and provisionally fixing said cover member at said position.

27. A method of manufacturing a fluid dynamic bearing according to claim 1,
wherein said sleeve member includes a substantially cylindrical sleeve having an inner peripheral surface radially opposed to the outer peripheral surface of said shaft, and a bearing housing located radially outward of said sleeve and having said sleeve fitted therein.

28. A method of manufacturing a fluid dynamic bearing according to claim 1,
wherein said cover member is fixedly welded on said cylindrical peripheral wall at a plurality of points along the outer peripheral edge of said cover member, and said weld zone is distributed along a circle symmetrically with respect to the center point of said cover member.

29. A method of manufacturing a fluid dynamic bearing according to claim 1,
wherein said cover member is continuously welded peripherally along the outer peripheral edge thereof.

30. A spindle motor for rotating a recording disk, comprising:
a fluid dynamic bearing manufactured by the manufacturing method described in claim 1, wherein said shaft base member has a surface on which to mount the recording disk;
an annular rotor magnet mounted on said rotor hub; and
a stator having a plurality of coils arranged in radially opposed relation to the peripheral surface of said rotor magnet.

31. A spindle motor for rotating a recording disk, comprising:
a fluid dynamic bearing manufactured by the manufacturing method described in claim 1, wherein said shaft base member constitutes at least a part of the housing of a recording disk drive unit;
a rotor hub mounted on said sleeve member;
an annular rotor magnet mounted on said rotor hub; and
a stator having a plurality of coils mounted on said base plate in radially opposed relation to the peripheral surface of said rotor magnet.

* * * * *